(12) United States Patent
DeRoller

(10) Patent No.: US 8,411,303 B2
(45) Date of Patent: Apr. 2, 2013

(54) METHOD AND SYSTEM FOR TRACKING DATA BASED ON GOVERNANCE RULES AND POLICIES

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 920 days.

(21) Appl. No.: 12/364,156

(22) Filed: Feb. 2, 2009

(65) Prior Publication Data

US 2010/0195138 A1     Aug. 5, 2010

(51) Int. Cl.
*G06F 3/12* (2006.01)
(52) U.S. Cl. ...................... 358/1.15; 358/1.14
(58) Field of Classification Search ........... None
See application file for complete search history.

(56) References Cited

U.S. PATENT DOCUMENTS

| | | | |
|---|---|---|---|
| 6,903,840 B1 | 6/2005 | Maymin et al. | |
| 7,362,461 B2 | 4/2008 | Reddy et al. | |
| 7,366,799 B2 | 4/2008 | Reddy et al. | |
| 2003/0182475 A1* | 9/2003 | Gimenez | 710/8 |
| 2008/0273224 A1 | 11/2008 | Maulsby et al. | |
| 2009/0009802 A1 | 1/2009 | Shaw et al. | |
| 2010/0002248 A1* | 1/2010 | Nuggehalli et al. | 358/1.14 |

OTHER PUBLICATIONS

Dazo et al., "Katun Print Software Solutions—A White Paper on Print Cost Opt. Sol.", InfoTrends, Network Doc. Sol., www.infotrends.com (May 22, 2007).
"Take Control of your Print Evolution Strategy", www.preosoftware.com/index, PREO Software Inc. (2006-2009).

* cited by examiner

*Primary Examiner* — Twyler Haskins
*Assistant Examiner* — Lennin Rodriguezgonzalez
(74) *Attorney, Agent, or Firm* — MH2 Technology Law Group LLP

(57) ABSTRACT

A method and system suitable for controlling output capabilities of a plurality of multifunction devices (MFDs), including a data module for analyzing data related to a plurality of tasks sent to the plurality of MFDs by a plurality of users; and a storage station for storing the data gathered from the plurality of tasks sent to the plurality of MFDs; wherein the data is analyzed based on preexisting output governance rules related to the plurality of users and the plurality of MFDs.

21 Claims, 7 Drawing Sheets

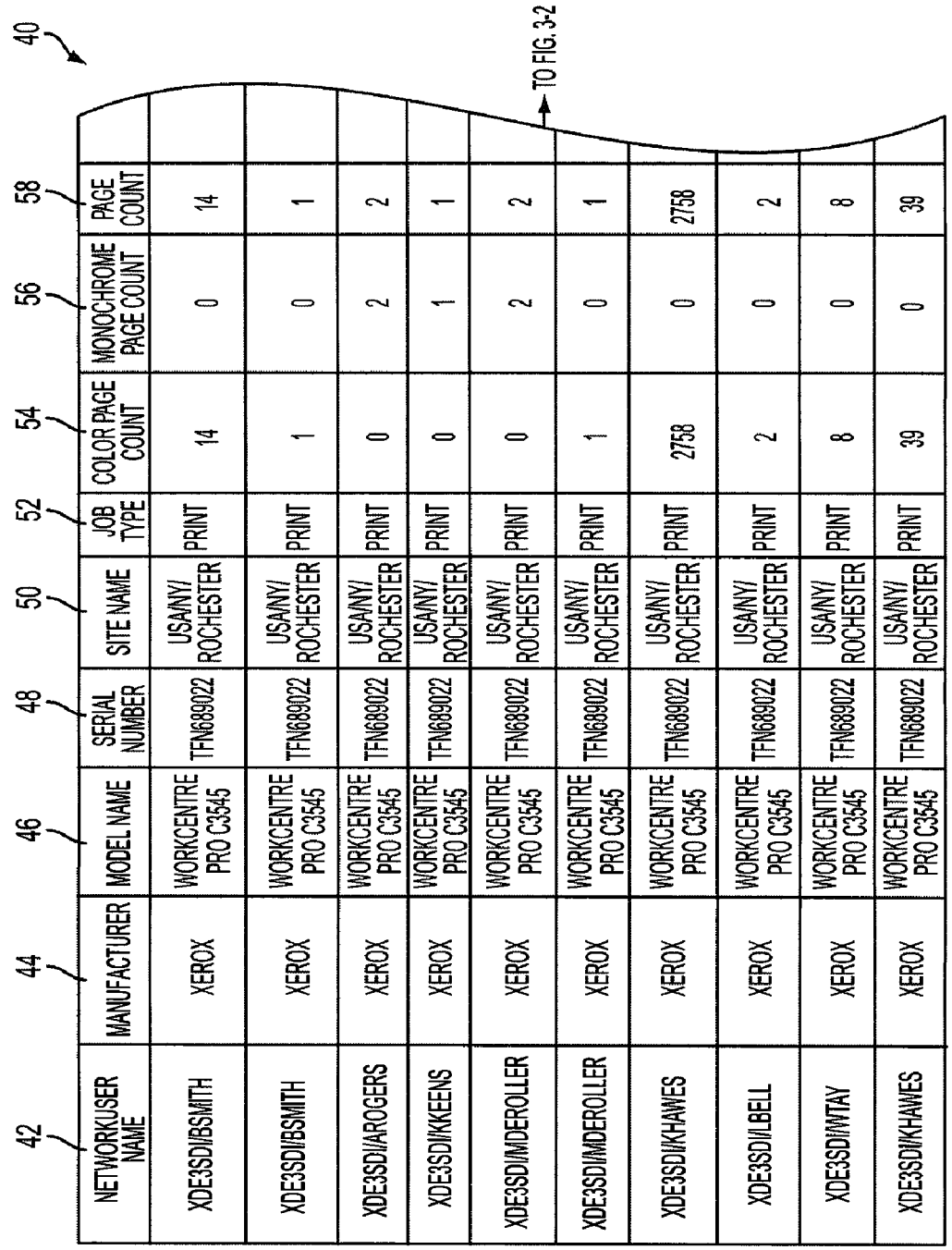

| 42 NETWORK/USER NAME | 44 MANUFACTURER | 46 MODEL NAME | 48 SERIAL NUMBER | 50 SITE NAME | 52 JOB TYPE | 54 COLOR PAGE COUNT | 56 MONOCHROME PAGE COUNT | 58 PAGE COUNT |
|---|---|---|---|---|---|---|---|---|
| XDE3SDI/BSMITH | XEROX | WORKCENTRE PRO C3545 | TFN689022 | USA/NY/ROCHESTER | PRINT | 14 | 0 | 14 |
| XDE3SDI/BSMITH | XEROX | WORKCENTRE PRO C3545 | TFN689022 | USA/NY/ROCHESTER | PRINT | 1 | 0 | 1 |
| XDE3SDI/AROGERS | XEROX | WORKCENTRE PRO C3545 | TFN689022 | USA/NY/ROCHESTER | PRINT | 0 | 2 | 2 |
| XDE3SDI/KKEENS | XEROX | WORKCENTRE PRO C3545 | TFN689022 | USA/NY/ROCHESTER | PRINT | 0 | 1 | 1 |
| XDE3SDI/MDEROLLER | XEROX | WORKCENTRE PRO C3545 | TFN689022 | USA/NY/ROCHESTER | PRINT | 0 | 2 | 2 |
| XDE3SDI/MDEROLLER | XEROX | WORKCENTRE PRO C3545 | TFN689022 | USA/NY/ROCHESTER | PRINT | 1 | 0 | 1 |
| XDE3SDI/KHAWES | XEROX | WORKCENTRE PRO C3545 | TFN689022 | USA/NY/ROCHESTER | PRINT | 2758 | 0 | 2758 |
| XDE3SDI/LBELL | XEROX | WORKCENTRE PRO C3545 | TFN689022 | USA/NY/ROCHESTER | PRINT | 2 | 0 | 2 |
| XDE3SDI/MTAY | XEROX | WORKCENTRE PRO C3545 | TFN689022 | USA/NY/ROCHESTER | PRINT | 8 | 0 | 8 |
| XDE3SDI/KHAWES | XEROX | WORKCENTRE PRO C3545 | TFN689022 | USA/NY/ROCHESTER | PRINT | 39 | 0 | 39 |

FIG. 3-1

| COLOR | DUPLEX | COPIES PRINTED | MEDIA SIZE | DOCUMENT NAME | DOCUMENT TYPE | JOB COMPLETION TIME |
|---|---|---|---|---|---|---|
| TRUE | FALSE | 1 | LETTER | FERS.XLS | MICROSOFT EXCEL WORKSHEET | 22-JAN-2008 07:11 AM |
| FALSE | FALSE | 1 | LETTER | MICROSOFT OFFICE OUTLOOK - DAILY STYLE | MICROSOFT OUTLOOK DOCUMENT | 22-JAN-2008 07:09 AM |
| FALSE | FALSE | 1 | LETTER | WEATHER.COM | WEB DOCUMENT | 21-JAN-2008 10:04 PM |
| FALSE | FALSE | 1 | LETTER | MAPQUEST.HTML | WEB DOCUMENT | 21-JAN-2008 09:55 PM |
| FALSE | FALSE | 1 | LETTER | MYRESUME.DOC | MICROSOFT OUTLOOK DOCUMENT | 21-JAN-2008 09:47 PM |
| TRUE | FALSE | 1 | LETTER | XSM | UNKNOWN | 22-JAN-2008 08:15 AM |
| TRUE | TRUE | 7 | LETTER | MICROSOFT POWERPOINT- B01 - XEROX JOB TICKET (VER1.38).PPT | MICROSOFT POWERPOINT PRESENTATION | 21-JAN-2008 05:50 PM |
| TRUE | FALSE | 1 | LETTER | MICROSOFT OFFICE OUTLOOK - MEMO STYLE | MICROSOFT OUTLOOK DOCUMENT | 21-JAN-2008 04:31 PM |
| TRUE | TRUE | 1 | LETTER | REMOTE DESKTOP REDIRECTED PRINTER DOC | UNKNOWN | 21-JAN-2008 04:03 PM |
| TRUE | TRUE | 3 | LETTER | MICROSOFT POWERPOINT- B01 - XEROX JOB TICKET (VER1.38).PPT | MICROSOFT POWERPOINT PRESENTATION | 21-JAN-2008 03:33 PM |

FIG. 3-2

```
:<Rule RuleId="Color Rule" Behavior="Confirm" MatchCriteria="Any">   ─82
 <Color Value="Color" />
 </Rule>
:<Rule RuleId="Submission Time" Behavior="Confirm" MatchCriteria="Any">   ─84
:<AllTimes Value="During">
  <Time DayOfWeek="Monday" HoursAndMinutesStart="08:00" HoursAndMinutesEnd="18:00" />
  <Time DayOfWeek="Tuesday" HoursAndMinutesStart="08:00" HoursAndMinutesEnd="18:00" />
  <Time DayOfWeek="Wednesday" HoursAndMinutesStart="08:00" HoursAndMinutesEnd="18:00" />
  <Time DayOfWeek="Thursday" HoursAndMinutesStart="08:00" HoursAndMinutesEnd="18:00" />
  <Time DayOfWeek="Friday" HoursAndMinutesStart="08:00" HoursAndMinutesEnd="18:00" />
 </AllTimes>
 </Rule>
:<Rule RuleId="Cost more than $1" Behavior="Confirm" MatchCriteria="Any">   ─86
 <Price Amount="1" Comparison="GreaterThan" />
 </Rule>
 <Rule RuleId="Enabled1" Behavior="Confirm" MatchCriteria="All" />
 <Rule RuleId="Enabled2" Behavior="Confirm" MatchCriteria="Any" />   ─88
 <Rule RuleId="Enabled3" Behavior="Confirm" MatchCriteria="Any" />
:<Rule RuleId="Enabled4" Behavior="Confirm" MatchCriteria="Any">
 <Side Value="Duplex" />
 <AllAssociated_DocumentTypes Value="Except_Specified_Types" />
 </Rule>
:<Rule RuleId="Enabled5" Behavior="Confirm" MatchCriteria="All">
:<AllAssociated_DocumentTypes Value="Specified_Types">
  <Associated_DocumentTypeId>SDE_GRAPHIC_DOCUMENT</Associated_DocumentTypeId>
  <Associated_DocumentTypeId>SDE_ADOBE_ACROBAT_DOCUMENT</Associated_DocumentTypeId>
  <Associated_DocumentTypeId>SDE_RICH_TEXT_FORMAT</Associated_DocumentTypeId>
  <Associated_DocumentTypeId>SDE_MICROSOFT_VISIO_DOCUMENT</Associated_DocumentTypeId>
```

FIG. 4

| Network User Name (92) | Manufacturer (94) | Model Name (96) | Serial Number (98) | Site Name (100) | Job Type (102) | Color Page Count (104) | Mono-chrome Page Count (106) | Page Count (108) | Color (110) | Duplex (112) | Copies Printed (114) | Media Size (116) | Document Name (118) | Document Type (120) | Job Completion Time (122) |
|---|---|---|---|---|---|---|---|---|---|---|---|---|---|---|---|
| XDE3SD/ MDEROLLER | XEROX | WORK CENTRE PRO C3545 | TFN689022 | USA/NY/ ROCHESTER | PRINT | 0 | 2 | 2 | FALSE | FALSE | 1 | LETTER | MYRESUME.DOC | MICROSOFT OUTLOOK DOCUMENT | 21-JAN-2008 09:47 PM |
| XDE3SD/ MDEROLLER | XEROX | WORK CENTRE PRO C3545 | TFN689022 | USA/NY/ ROCHESTER | PRINT | 1 | 0 | 1 | TRUE | FALSE | 1 | LETTER | XSM | UNKNOWN | 22-JAN-2008 08:15 AM |
| XDE3SD/ KHAWES | XEROX | WORK CENTRE PRO 90 | SN1434565 | USA/NY/ ROCHESTER | PRINT | 39 | 0 | 39 | TRUE | TRUE | 3 | LETTER | MICROSOFT POWER POINT - B01 - XEROX JOB TICKET (VER1.38)/PPT | MICROSOFT POWERPOINT PRESENTATION | 21-JAN-2008 03:33 PM |

FIG. 5

METHOD AND SYSTEM FOR TRACKING DATA BASED ON GOVERNANCE RULES AND POLICIES

BACKGROUND

1. Field of the Related Art

The present disclosure relates to print management systems and paper-reducing technologies, and more particularly, to a method and system for analyzing task tracking data by utilizing pre-existing governance rules and policies.

2. Background of the Related Art

Organizations such as business enterprises, educational, government and medical institutions often have large expenditures relating to printing paper documents, and often experience difficulty with control over the flow of information by printed documents, as the print volume of multifunctional systems has risen sharply in recent years. In the printing context, the main issue is that the cost-per-page of high-performance multifunctional systems. In most entities, attempts to control high-performance multifunctional system print volumes and the associated cost increases have been largely unsuccessful. To make matters worse, potential environmental issues with high-performance multifunctional system are becoming a concern. Resolving these issues is a top priority among IT professionals and the corporations that employ a plurality of MFDs for their business needs.

Furthermore, photocopiers continue to advance in terms of the functionality and flexibility they provide. For example, rather than being stand alone machines as they once were, many copy machines now have digital processing capabilities and network interfaces which allow them to be connected to a computer network. This provides a variety of advantages. Once such advantage is that the copiers may be used as multi-function devices (MFDs) not only for performing traditional photocopying, but also for printing documents generated by computers connected to the network. Moreover, where copiers are connected to a computer network, it becomes possible to collect status and usage information from the computers remotely via a network server or other network terminal. Another advantageous aspect of having networked copiers or MFDs is the ability to monitor and account for the usage of such MFDs.

In general, a MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission capabilities combined with their functionality, it would be useful to efficiently analyze, for example, print job tracking data related to a plurality of MFDs.

Various conventional print management systems include modules that capture billing information for organizations to allocate cost within the organization or to bill clients with photocopying costs. Other systems monitor and limit print behavior by users. For example, only certain individuals may be permitted to process expensive print jobs such as multi-color printing or very large print jobs. However, such systems simply place limits on user behavior in order to reduce cost and do not track, for example, print jobs, based on a set of pre-established rules and policies.

Despite the advances in electronic document storage in recent years, paper based documents are still required for many reasons by businesses, including readability and record maintenance. As a result, the use of MFDs is extensive and growing. The costs associated with MFDs can be significantly high, especially for color printing, and it may therefore be extremely beneficial to many businesses to know what their printer resource usage is so that the costs associated therewith may be determined for accounting purposes.

Thus, as office printer manufacturers market more color printing capability in the enterprise office environment, customers desire assurances from their managed output service providers that access to MFDs with color producing capabilities is being tracked and controlled, as color printing is typically more expensive than black and white printing. Additionally, customers desire insight into who is generating color volume, so that overages can be charged back to individuals or departments. Moreover, customers desire governance/control over who can print and copy in color. Often, these assurances are part of the service level agreement that the managed output service provider has with the customer. Thus, it is desirable that output management solutions are managed correctly to ensure effective governance since any gaps in governance could result in missed cost savings. However, detecting gaps in coverage can be problematic and time consuming for administrators of output management solutions.

Consequently, in conventional systems, there is no method for automatically checking for gaps in output governance (i.e., inconsistencies between users, MFDs, and pre-established rules and policies relating to the users and the MFDs). Thus, current systems lack the capability to effectively analyze, for example, print job tracking data. The present disclosure is intended to overcome the drawbacks of other methods by providing for an effective print/scan/copy/fax job tracking system and method by utilizing pre-existing governance rules and policies related to the plurality of users and the plurality of MFDs.

SUMMARY

The present disclosure provides a system suitable for controlling output capabilities of a plurality of multifunction devices (MFDs), the system including a data module for analyzing data related to a plurality of tasks sent to the plurality of MFDs by a plurality of users; and a storage station for storing the data gathered from the plurality of tasks sent to the plurality of MFDs; wherein the data is analyzed based on preexisting output governance rules related to the plurality of users and the plurality of MFDs.

The present disclosure also provides a method suitable for controlling output capabilities of a plurality of multifunction devices (MFDs), the method including analyzing data related to a plurality of tasks sent to the plurality of MFDs by a plurality of users via a data module; and storing the data gathered from the plurality of tasks sent to the plurality of MFDs via a storage station; wherein the data is analyzed based on preexisting output governance rules related to the plurality of users and the plurality of MFDs.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein:

FIGS. 3-1 and 3-2 show a table including job tracking data related to the plurality of users and plurality of MFDs, in accordance with the present disclosure;

FIG. 4 is a portion of software code related to output governance rules, in accordance with the present disclosure;

FIG. 5 is a table including gap results related to the plurality of users and plurality of MFDs, in accordance with the present disclosure.

DETAILED DESCRIPTION

Figure 1:
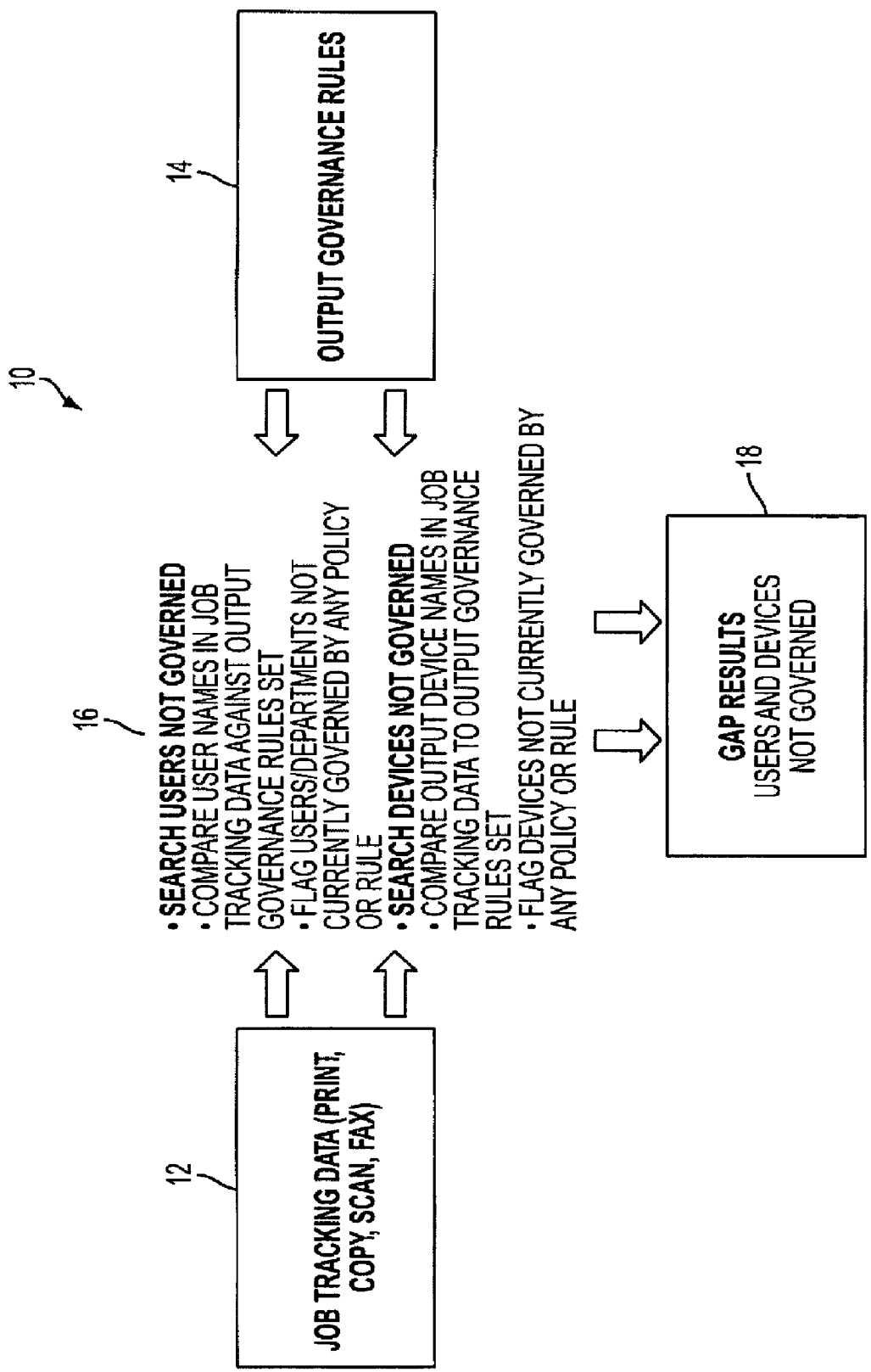
FIG. 1 is a high-level schematic diagram of a job tracking system for automatically checking for gaps in output governance, in accordance with the present disclosure.

The present disclosure proposes a method for analyzing job tracking data and for comparing such job tracking data against existing print rules and policies (e.g., governance rules and policies already in place). The method attempts to identify data showing users or MFDs that aren't covered by any governance rules and/or policies. The method is also run periodically or in real-time to account for changing user sets, departments, and MFDs (e.g., on a daily basis or an hourly basis or on a real-time basis). Users and MFDs identified as gaps (e.g., detection on unregistered user and/or MFD) should result in updates to the output governance rules. Thus, a tool is presented for comparing job tracking data against a set of rules and/or polices that are in place to more effectively monitor printer management systems including a plurality of MFDs.

The present disclosure further proposes a system that analyzes job tracking data in an output management solution and comparing such job tracking data against existing print rules and policies seeking gaps in the governance rules for the department being managed. Conventional systems do not use job tracking data in this manner, but instead require print administrators to manually examine the data at the end of a chargeback period seeking potential gaps (e.g., instances where a printer or print user is unknown to the system). The system and method of the present disclosure continuously compares the job tracking data against the output governance rules and policies. If there are users or MFDs that are not currently covered by the governance rules and/or policies, the system and method flags that user or MFD by alerting a system administrator that governance rules and/or polices should be updated and/or created for that user or MFD or exclude such user and/or MFD from the print management system.

It is therefore an object of the present disclosure to provide a computer network and related methods which generate MFD usage information that may be analyzed to determine a more efficient allocation of MFD resources and, consequently, promote more responsible use and a better understanding of printing costs related to the plurality of MFDs. Print assessments can uncover many costs associated with printing and output and they reveal how customers are using their office equipment. The goal is to tailor an entity's printing and output solution to its specific needs. By performing a print/output assessment, an entity (such as a company or organization) may be able to reduce the amount of output devices on the network, leading to greater efficiency and service levels throughout the entity.

The exemplary embodiments of the present disclosure present a package that is distributed to clients by authorized dealers and facilitates entity-wide assessment, management, and control of copier and printing costs as well as cost optimization. The printing system of the present disclosure measures and generates an analysis of the customer's device fleet (such as MFDs) performance by using built-in reporting, tracking, analyzing, and updating modules. The resulting data enables the creation of service strategies and billing models tailored to an entity's goals. The copier and printer cost evaluation can be measured by using various criteria such as user, department, project, and client or machine number. All print jobs can be classified by volume and user and it is also possible to correctly differentiate between color and black and white jobs, paper formats, and paper types. As a result, this is a dynamic system because it is updated selectively, dynamically, and automatically in accordance with input received from the users or input received from a data tracking module.

The present disclosure further relates to a print management method and system. In general, the rules-based system components of the present disclosure may create, test and modify rules, track all print usage and the application of rules and/or policies, and user responses thereto, or provide reports on print usage and behavior modification to a variety of authorized users. The present disclosure enables efficient gathering of data related to the plurality of users and/or the plurality of MFDs by aiding a system administrator in determining the amount spent on each MFD by each user or the amount spent by one user on a plurality of MFDs. In addition, the plurality of users are empowered and educated to better understand alternatives when printing to a plurality of MFDs.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

As used herein, "print job" is not limited to a particular electronic format, such a bitmap, but can include any suitable format including PDF, word processor formats, rich text (RTF), etc., as will be appreciated by those skilled in the art.

The term "task" refers to a print, scan, copy, and/or fax job or any type of function that may be performed by an MFD. The term "task" may also refer to an execution path through address space, such as a set of program instructions that are loaded in a data storage means. The term "task" may also refer to a basic unit of programming that an operating system controls and depending on how the operating system defines a task in its design, this unit of programming may be an entire program or each successive invocation of a program.

The term "output governance rules" refers to a principle or condition that governs an output task related to a plurality of MFDs.

The term "module" may refer to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

The term "rule" may refer to a principle and/or condition where one or more MFDs are caused to perform one or more requested tasks according to a preset/predetermined default mode as a result of the principles and/or conditions when the task is requested. The term "rule" may also refer to a prescribed guide for action for the plurality of MFDs. Examples of rules may include, but are not limited to: allow only certain users to print in color, allow only certain users to print black and white, allow only certain users to make more than a preset amount of copies per printer, allow only certain users to scan or fax or copy, allow only certain users to print graphics, allow most users to print text, allow only certain users to print information from the Internet, allow only certain users to print single sided, allow only certain users to print unlimited information, allow a set amount of print jobs from a terminal to one MFD or to a plurality of MFDs, allow for switching of MFDs when a quota has been reached, allow for denial of access to any of the MFDs, allow for counting the number of pages printed from each terminal to any permissible MFD, etc.

The term "analyze" may refer to determining the elements or essential features or functions or processes of a plurality of MFDs and/or to subject the plurality of MFDs to computational processing. The term "analyze" may further refer to tracking data and/or collecting data and/or manipulating data and/or examining data and/or updating data on a real-time basis in an automatic manner and/or a selective manner and/or manual manner.

Embodiments will be described below while referencing the accompanying figures. The accompanying figures are merely examples and are not intended to limit the scope of the present disclosure.

With reference to FIG. 1, there is presented a high-level schematic diagram of a job tracking system for automatically checking for gaps in output governance, in accordance with the present disclosure. The job tracking system 10 includes a job tracking data module 12, an output governance rule module 14, an analyzing module 16, and a gap results module 18.

In FIG. 1, the job tracking data module 12 may include, but is not limited to, print jobs, copy jobs, fax jobs, and/or scan jobs. One or more users may initiate such jobs from a plurality of MFDs, described in more detail with reference to FIG. 2 below. The output task jobs sent by the job tracking data module 12 are compared against the rules and policies located in the output governance rule module 14 via the analyzing module 16.

The analyzing module 16 may, for example, search for users not governed by the rules and policies located in the output governance rule module 14 by comparing user names in job tracking data against output governance rules and policies. If a user name is not found, the analyzing module 16 may flag the user or department currently not governed by any policy or rule located in the output governance rule module 14.

Additionally, the analyzing module 16 may, for example, search for MFDs not governed by the rules and policies located in the output governance rule module 14 by comparing MFD in the output task job tracking data against output governance rules and policies. If a MFD is not found, the analyzing module 16 may flag the MFD or department in which the MFD is located that is currently not governed by any policy or rule located in the output governance rule module 14. Once the analyzing module 16 makes such determinations, it sends the results to the gap results module 18, where the results may be stored in a database.

Furthermore, the comparison results may be stored separately in a local or remote database for further processing. This may be a unique database designed solely for storing and analyzing such comparison data. Also, once a history of the modified rules is collected and stored for each of the plurality of MFDs, that history may be evaluated in the future for determining which rule/policy modifications achieved the best desired results for each MFD. In other words, the rule changes that took place for each MFD may be stored and later compared against each other (for the same MFD) and ranked in order of best achieved results. The highest ranked rules for one MFD may be used in changing the rules/policies of other MFDs.

Figure 2:
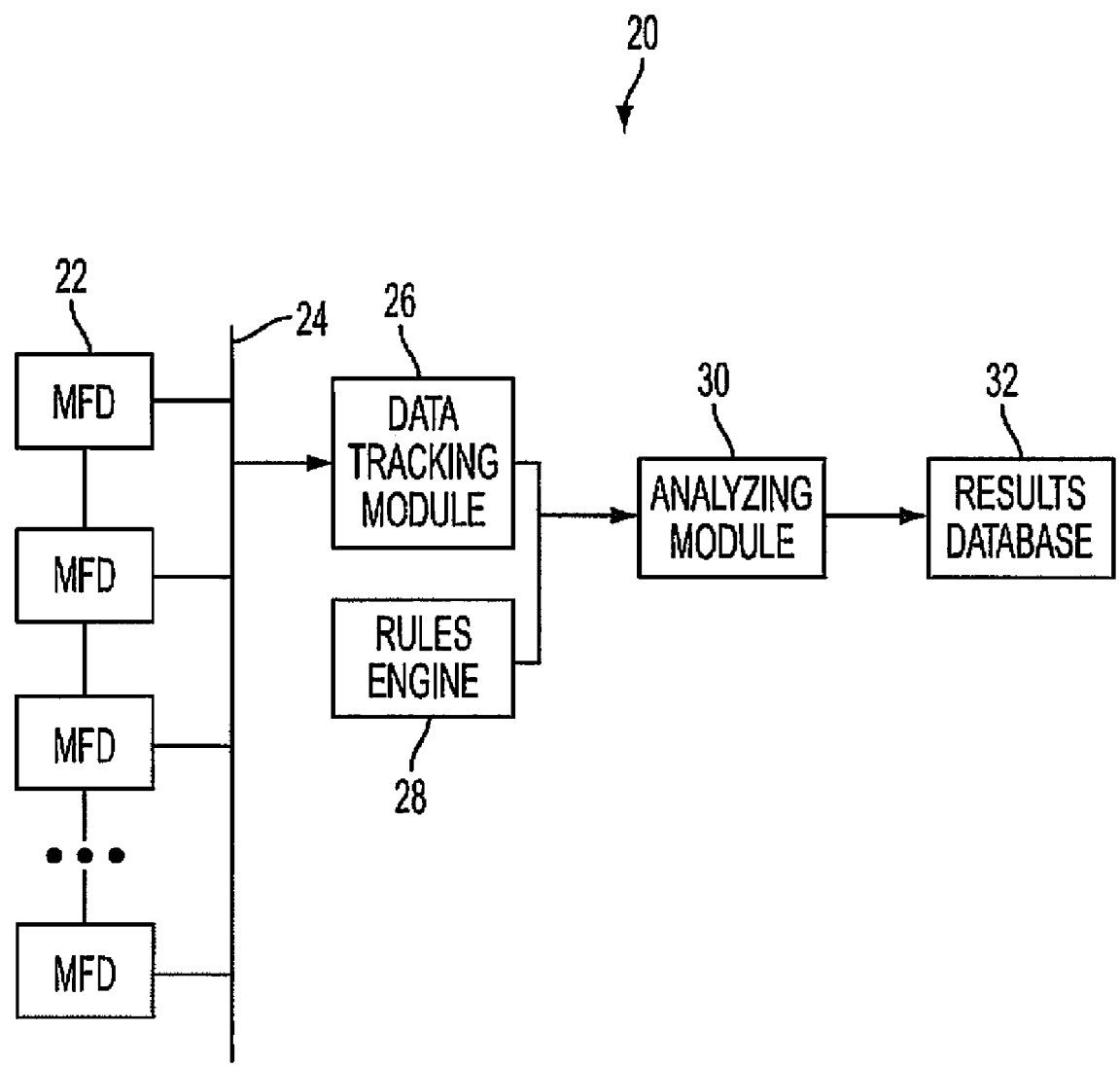
FIG. 2 is a detailed schematic diagram of a job tracking system for automatically checking for gaps in output governance where the plurality of MFDs are connected to the data tracking module via a network bus, in accordance with the present disclosure.

With reference to FIG. 2, there is presented a detailed schematic diagram of a job tracking system for automatically checking for gaps in output governance where the plurality of MFDs are connected to the data tracking module via a network bus, in accordance with the present disclosure. The job tracking system 20 includes a plurality of MFDs 22, a network bus 24, a data tracking module 26, a rules engine 28, an analyzing module 30, and a results database 32.

In FIG. 2, the plurality of MFDs 22 may send output task jobs via a network bus 24 to a data tracking module 26. The data tracking module 26 compares the data based on the rules engine 28 and sends the comparison data to the analyzing module 30 for further processing. The analyzing module 30 determines, among other things, whether the users and/or MFDs are known or unknown to the system 20 and sends the results to the results database 32.

In general, the components of the job tracking system 20 capture the specifications of every output task job, evaluate business rules and/or policies in the context of the output task job, evaluate end-user profile and behavioral history, interact with the end user to provide advice or direction related to the job, and record the user's response. All information related to each rule-processing transaction is uploaded or saved to a database or server. The server may be a local server or a remote server.

The data tracking module 26 tracks and monitors the print queues on the plurality of MFDs 22 for the arrival of new print jobs (or any other type of output task jobs). When data tracking module 26 detects a new output task job, it notifies the rules engine 28, which queries the print queue of the plurality of MFDs 22 for the print job's specifications (e.g., user name, MFD name, MFD location, etc). The data tracking module 26 includes detecting such information as the number of copies and pages to be printed, whether the job is to be printed in color, and other details which may be pertinent. The data tracking module 26 describes the document to be printed and the printer settings requested by the end-user. In one embodiment, the data tracking module 26 gathers such information for every output task job and transmits such information to the results database 32 for storage. The rules engine 28 also queries the data tracking module 26 for information about the user and his or her past printing behavior, referred to herein as the user's "usage history."

The rules engine 28 evaluates the rules and/or policies after comparing them to the data collected from the data tracking module 26, user profile, MFD profile, and usage history, thus obtaining a set of candidate rules for execution. The rules engine 28 then evaluates the rules and/or policies on this set of candidate rules and the situation, and further filters and/or prioritizes the rules and/or policies. Finally, the rules engine 28 selects one or more rules and/or polices to execute, by evaluating a final-selection rules and/or policies. In other words, the rules engine 28 has the option of selecting one rule or more than one rule to compare against the data collected from the data tracking module 26. The rule selection process may be based on the user name, the MFD name, the user location, the MFD location, usage history of user, usage history of MFD, access times, printing requirements, size of output job, paper requirements, and/or priority of the rule or policy. The rule selection process may also be based on statistical comparison data, as for example, rules based on patterns generated from one or more collected, tracked, and analyzed data. These statistical techniques may enable enforcement of corporate policies/rules concerning what types of traffic are acceptable or permissible by users.

The rules engine 28 sends a description of the actions to be performed, as specified by the selected rule and/or policy, to the analyzing module 30. Actions may include displaying the output task job's cost, advising the user on more cost-effective alternatives, or requiring the user to enter a charge code or cancel and resubmit the job in a preferred configuration, or combinations of such actions.

The database 32 may be a cache of potentially thousands (or more) of users and their access levels may be stored in each MFD or a local or remote server for instant access. The cache may be updated whenever the access levels and grouping table change in the database 32. Actions taken based on a user's access levels may be implemented by use of the rule-based decision engine 28.

Additionally, the rules and/or principles may be modified and/or updated by an authorized user or by a plurality of authorized users at any desirable time for any of the plurality of MFDs. In other words, an authorized user may modify all the rules or a portion of the rules for only one MFD or for a group of MFDs or for all MFDs. Thus, certain MFDs may have different rules than other MFDs based on their usage, geographical location, and/or user access requirements even though such MFDs may be located in a single location or be part of the same group of MFDs.

With reference to FIGS. 3-1 and 3-2, there is presented a table including job tracking data related to the plurality of users and plurality of MFDs, in accordance with the present disclosure.

The table 40 includes a plurality of columns. The columns may include data related, but not limited to, the following categories: A network user name 42, a manufacturer 44, a model name 46, a serial number 48, a site name 50, a job type 52, a color page count 54, a monochrome page count 56, a page count 58, color 60, duplex 62, copies printed 64, media size 66, document name 68, document type 70, and job completion time 72.

FIGS. 3-1 and 3-2 illustrate an example of a job tracking data table 40 that is typically collected by most output management solution systems. This data shows output activity, and in this case, printing activities. However, copy, scan, and fax capabilities may also be tracked. If an output management solution doesn't have its own source of job tracking data, then $3^{rd}$ party sources could be used.

With reference to FIG. 4, there is presented a portion of software code related to output governance rules, in accordance with the present disclosure.

The code 80 includes a color rule 82, a submission time rule 84, a cost rule 86, and an enabled rule 88. Obviously, these are just a sample or rules that may be incorporated in the rules engine 28 of FIG. 2. One skilled in the art may contemplate a plethora of rules and/or policies to incorporate in a rules engine 28 based on system requirements. The rules may be written in any type of programming language that would be compatible with a printing system having a plurality of MFDs.

The output governance rules are configured in the output management software for the governance of at least printing, copying, faxing, and scanning in the enterprise. These rules are often associated with an MFD or groups of MFDs. They can be configured to control printing at the user level (groups of users in departments). In large-scale deployments, configuration and management of these rules can be a very complex task. However, the exemplary embodiments of the present disclosure allow for ease of data flow and efficient operation through the use of rules and/or policies designed specifically for users and MFDs.

Another example of a rule could be the conversion of specific internal reports from a one-sided format and print device to a double-sided format and print device. This reduces paper costs by 50%. The code 80 could offer a number of optimization routines in which a project manager determines which ones are relevant for his/her entity. Theoretically, code 80 could offer the option to define the maximum print and/or copier budget in a given month for each or selected user.

Another example of a rule could be that each MFD may be operated in accordance with a particular set of rules. By way of example, if a user has reached his weekly quota of copies, the MFD may be disabled for that user. Also, if someone is trying to make too many copies on a low volume MFD, he/she is told to move to a higher-volume MFD. Another rule may be if it is a weekend, then color copying is disabled from one or more or all MFDs.

Moreover, in certain networks or environments, MFDs may be organized into logical groups of various levels. Users of one group may be restricted from using MFDs in a different group depending on use permissions or access rights, for example. Each user is assigned a set of access levels. For instance, a member of the executive group may have access to any of the company MFDs worldwide, and administrative group member may only have access to local MFDs, and a member of the apprentice group may only have permission to do black and white copying. As a result, rules and/or policies may be formed that apply to specific groups of MFDs. In other words, each MFD or group of MFDs may have a different set of rules and/or policies depending on a variety of factors, such as level of authority within an entity.

With reference to FIG. 5, there is presented a table including gap results related to the plurality of users and plurality of MFDs, in accordance with the present disclosure.

The table 90 includes a plurality of columns. The columns may include data related, but not limited to, the following categories: a network user name 92, a manufacturer 94, a model name 96, a serial number 98, a site name 100, a job type 102, a color page count 104, a monochrome page count 106, a page count 108, color 110, duplex 112, copies printed 114, media size 116, document name 118, document type 120, and job completion time 122.

This data shows output activity, and in this case, printing activities. However, copy, scan, and fax capabilities may also be tracked. If an output management solution doesn't have its own source of job tracking data, then $3^{rd}$ party sources could be used.

The gap results significant aid a system administrator in determining cost of a printing system having a plurality of MFDs. For example, the difficulty of accurate supply provisioning for MFDs lies in the exact recording of the actual office supplies used. This is particularly critical in the case of the calculation of overall cost per page. The life of the office materials used, such as the toner cartridges or ink, and the customer and user specific surface coverage of toner per page have a serious impact on the profitability of the established service contract. Timely reordering of office supplies is important to ensure that a client's work is free of disruption. On the other hand, an excessively large warehoused inventory of office supplies is an expense that should be strictly avoided. Thus, according to the exemplary embodiments of the present disclosure, all the maintenance expenses of the copier and printer devices (or MFDs) may be saved in a database for each individual MFD. Certain expenses, such as exchange of empty toner cartridges or defective drums, may be automatically registered. In accordance with the electronic price list, the actual costs incurred per device are registered and made available for all further analysis. As a result, this is a dynamic table because it is updated selectively, dynamically, and automatically.

Figure 6:
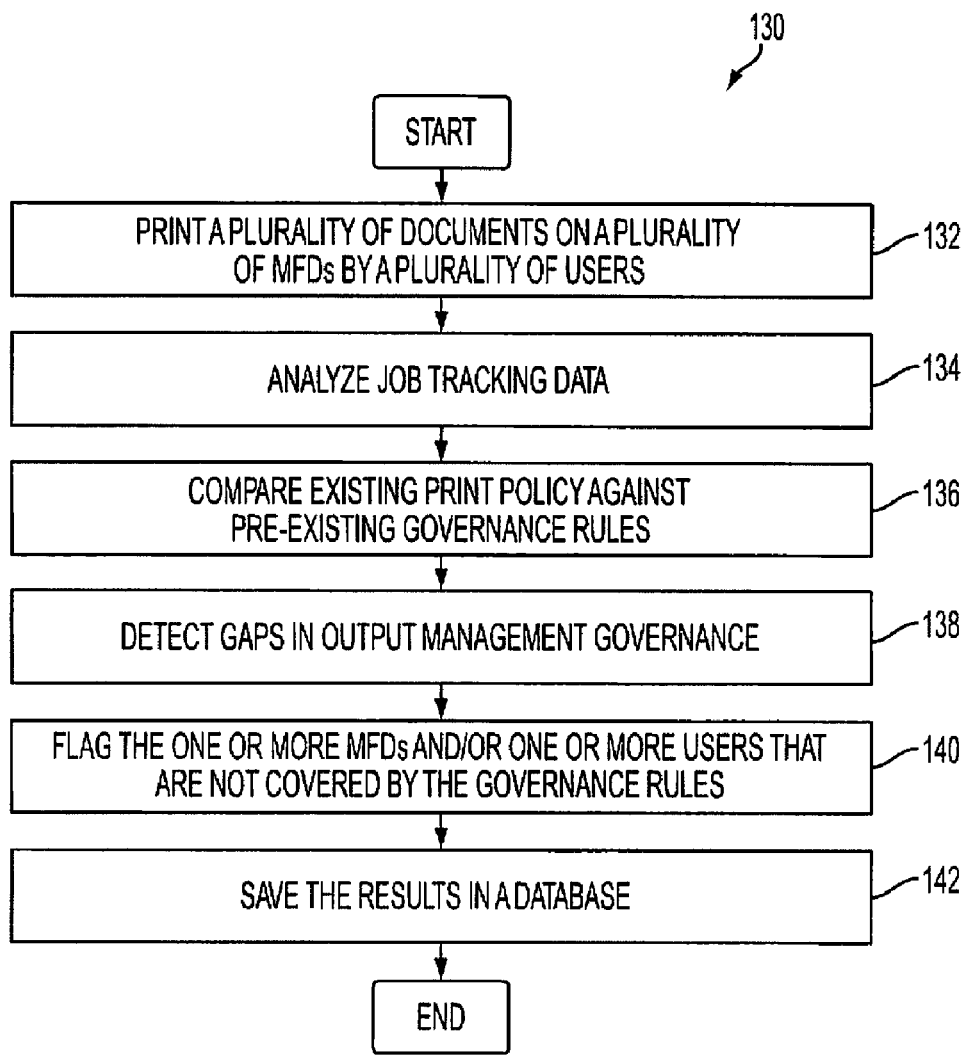
FIG. 6 is a flowchart illustrating a job tracking system for automatically checking for gaps in output governance, in accordance with the present disclosure.

With reference to FIG. 6, there is presented a flowchart illustrating a job tracking system for automatically checking for gaps in output governance, in accordance with the present disclosure.

The flowchart 130 includes the following steps. In step 132, a plurality of documents are printed from a plurality of MFDs by a plurality of users. In step 134, the job tracking data is analyzed. In step 136, the existing print policy is compared against pre-existing governance rules. In step 138, gaps in the output management governance are detected. In step 140, the one or more MFDs and/or the one or more users are flagged when they are not covered by the governance rules. In step 142, the gap results are saved in a database. The process then ends.

Moreover, the managed print services provider may take the following actions. For instance, users may be added to policy/rule if needed. The system may have to check with the customer on the user's role within a department. Also, print devices may be checked for being in-scope. If they are in-scope, then their contract and entitlement may be reviewed either manually or automatically. Furthermore, print devices (such as MFDs) may be added to policy/rule if needed. The managed print services provider ensures that gap checking is occurring daily or hourly or in real-time so that gaps like these can be identified and corrected immediately by a system administrator.

As a result, the conventional processes for determining gaps in print governance are time consuming, and do not allow for the managed print services provider to be proactive in identifying problems and correcting them. For example, the End of Month (EOM) billing cycle is when the customer reviews print and chargeback activity from the previous month. Print job tracking data is typically used to show print activity for users/departments/MFDs, and associated chargebacks. The customer is seeking for any overages that were unexpected, like a particular user or department or MFD that's printing color more than they should be, or a MFD that doesn't appear to have any print governance in place. This puts the managed print services provider in a difficult position, having to explain why there are gaps in their print governance. Depending on the service level agreement with the customer, they may not be able to bill the customer for those overages.

Thus, the exemplary embodiments of the present disclosure have the following benefits of efficient gap checking, including allowing the managed print services provider to identify potential gaps in print governance well before the customer sees the data. The provider can then make changes to the policies/rules in place, to correct the problem.

The present disclosure proposes an alternative method that takes advantage of governance rules based on data tracking capabilities. The approaches described above provide any service provider with several approaches for tracking data and utilizing governance rules and/or policies. Furthermore, the concept of applying governance rules and/or policies to data received from a plurality of MFDs is a general concept in that it can be used for any type of applications contemplated by one skilled in the art. For example, any service provider could provide/control/own/sell the MFDs. In addition, service providers could use any type of printer and/or MFD and/or electronic device to achieve the desired results of the present disclosure. Also the printing system of the present disclosure makes it easier for information technology (IT) groups and/or service providers to manage the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

In summary, the exemplary embodiments of the present disclosure leverage data that is already collected by most output management solutions in the market today, in a way that's unique and useful by providing a system and method for detecting gaps in output management governance by comparing data tracking results to governance rules and/or policies. Further advantages and benefits of the present disclosure are: (1) leverages existing job tracking data that's already being collected for chargeback and billing purposes, (2) eliminates the need for administrators to manually peruse data for gaps in print governance coverage, (3) can identify potential gaps sooner, rather than waiting for the end-of-month billing cycle review, and (4) gives managed output services providers another tool for proactively controlling print cost at a customer's site.

Moreover, in accordance with the exemplary embodiments, customers are able to reduce or recover the cost of printing with minimal effort to set up and administer a system. Customers will be able to measure the true costs of printing on all the MFDs connected to or attempting to connect to the system. Customers will also be able to implement print policies and/or rules for cost reduction and charge-out at the point of print decision-making. Customers will also be able to easily set up the system and configure the system to their desired specifications since the system automatically discovers MFDs and users accessing the system. Customers may also purchase a system that includes a set of preset or predetermined defaults rules and/or policies that may be modified in any desirable manner based on cost reduction goals, cost recovery goals, and/or green initiatives. Customers will further be able to measure, understand, and gain control over the costs and environmental impact of printing in the organization by analyzing print volumes and usage by department, organization, and/or location. Additionally, customers will be able to accomplish print management objectives with minimal risk to any IT infrastructure and will be able to use rules and/or policies to prevent end-user complaints by enabling the system administrator to tune how often a user sees a message, relative to the user's compliance level. Finally, new users may be trained on print rules and policies as they do their work and progress through the organization and analytic reports will enable the system administrator to gauge rules' effectiveness on target user groups.

Additionally, customers gain the ability to manage their fleet of MFDs and reduce their entity's print costs significantly by rerouting their output to more cost effective MFDs. In addition, end users' productivity is virtually interruption free due to the predictive and proactive service of their MFDs, as well as the automated replenishment of supplies. Office equipment dealers are able to capture untapped office desktop print volume by either rerouting customers' output to their MFDs or by offering alternative sources for supplies and service for these desktop print devices.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printer management system suitable for controlling output capabilities of a plurality of multifunction devices (MFDs), the system comprising:
   a processing system comprising one or more processors; and
   a memory system comprising one or more computer-readable media, wherein the computer-readable media contain instructions that, when executed by the processing system, cause the processing system to perform operations comprising:
      receiving a task sent by a user to an MFD from the plurality of MFDs;
      determining that no preexisting output governance rules associated with the user have previously been created;
      creating one or more output governance rules associated with the user based on
         determining that no preexisting output governance rules associated with the user have previously been created, and
         a usage history of the user; and
      analyzing data related to the task based on:
         the one or more output governance rules associated with the user; and
         one or more output governance rules associated with the MFD, independently configurable from governance rules associated with a remainder of the plurality of MFDs.

2. The system according to claim 1, the operations further comprising analyzing the data based on the output capabilities of the MFD, wherein the output capabilities include one or more of the following: printing, copying, scanning, and faxing.

3. The system according to claim 1, the operations further comprising:
searching for one or more preexisting output governance rules associated with the user; and
searching for one or more preexisting output governance rules associated with the MFD.

4. The system according to claim 1, wherein creating the one or more output governance rules associated with the user comprises receiving the one or more output governance rules associated with the user from an administrator.

5. The system according to claim 3, wherein:
no preexisting output governance rules associated with the MFD are found;
the operations further comprising creating one or more output governance rules associated with the MFD.

6. The system according to claim 5, wherein creating the one or more output governance rules associated with the MFD comprises receiving the one or more output governance rules associated with the MFD from an administrator.

7. The system according to claim 1, wherein the data is analyzed on a real-time basis and provides real-time information to an administrator.

8. A method suitable for controlling output capabilities of a plurality of multifunction devices (MFDs), the method comprising:
receiving a task sent by a user to an MFD from the plurality of MFDs;
determining that no preexisting output governance rules associated with the user have previously been created;
creating one or more output governance rules associated with the user based on determining that no preexisting output governance rules associated with the user have previously been created, and
a usage history of the user; and
analyzing data related to the task based on:
the one or more output governance rules associated with the user; and
one or more output governance rules associated with the MFD, independently configurable from governance rules associated with a remainder of the plurality of MFDs.

9. The method according to claim 8 further comprising analyzing the data based on the output capabilities of the MFD, wherein the output capabilities include one or more of the following: printing, copying, scanning, and faxing.

10. The method according to claim 8 further comprising;
searching for one or more preexisting output governance rules associated with the user; and
searching for one or more preexisting output governance rules associated with the MFD.

11. The method according to claim 8, wherein creating the one or more output governance rules associated with the user comprises receiving the one or more output governance rules associated with the user from an administrator.

12. The method according to claim 10, wherein:
no preexisting output governance rules associated with the MFD are found;
the method further comprising creating one or more output governance rules associated with the MFD.

13. The method according to claim 12, wherein creating the one or more output governance rules associated with the MFD comprises receiving the one or more output governance rules associated with the MFD from an administrator.

14. The method according to claim 8, wherein the data is analyzed on a real-time basis and provides real-time information to an administrator.

15. A non-transitory computer-readable medium storing programmable instructions configured for being executed by at least one processor for performing a method suitable for controlling output capabilities of a plurality of multifunction devices (MFDs), the method comprising:
receiving a task sent by a user to an MFD from the plurality of MFDs;
determining that no preexisting output governance rules associated with the user have previously been created;
creating one or more output governance rules associated with the user based on determining that no preexisting output governance rules associated with the user have previously been created, and
a usage history of the user; and
analyzing data related to the task based on:
the one or more output governance rules associated with the user; and
one or more output governance rules associated with the MFD, independently configurable from governance rules associated with a remainder of the plurality of MFDs.

16. The non-transitory computer-readable medium according to claim 15, the method further comprising analyzing the data based on the output capabilities of the MFD, wherein the output capabilities include one or more of the following; printing, copying, scanning, and faxing.

17. The non-transitory computer-readable medium according to claim 15, the method further comprising:
searching for one or more preexisting output governance rules associated with the user; and
searching for one or more preexisting output governance rules associated with the MFD.

18. The non-transitory computer-readable medium according to claim 15, wherein creating the one or more output governance rules associated with the user comprises receiving the one or more output governance rules associated with the user from an administrator.

19. The non-transitory computer-readable medium according to claim 17, wherein:
no preexisting output governance rules associated with the MFD are found;
the method further comprising creating one or more output governance rules associated with the MFD.

20. The non-transitory computer-readable medium according to claim 19, wherein creating the one or more output governance rules associated with the MFD comprises receiving the one or more output governance rules associated with the MFD from an administrator.

21. The non-transitory computer-readable medium according to claim 15, wherein the data is analyzed on a real-time basis and provides real-time information to an administrator.

* * * * *